3,478,212
AIMING SYSTEM FOR THE REMOTE GUIDANCE OF SELF-PROPELLED MISSILES TOWARD A TARGET

Jean Paul Turck, Paris, France, assignor to Societe Anonyme de Telecommunications, Paris, France, a French company
Filed Jan. 4, 1967, Ser. No. 607,201
Claims priority, application France, Jan. 27, 1966, 47,424
Int. Cl. G01t *1/16*
U.S. Cl. 250—83.3          9 Claims

ABSTRACT OF THE DISCLOSURE

Remote guidance for self-propelled missiles towards a target, having an orientable sighting instrument and an orientable electronic camera directionally associated with said instrument adapted for emitting control signals for the said missile and having a range of infra-red spectral sensitivity different from that of the sighting instrument, the target and the missile both being exposed to infra-red radiations which embrace both ranges of sensitivity, whereas the missile has reflecting-filtering means able to substantially absorb the infra-red range corresponding to the spectral sensitivity of the sighting means.

---

This invention relates to the remote guidance of self-propelled missiles towards a target as has been described, for example, in U.S. Patent No. 2,989,640 granted on June 20, 1961.

In this remote guidance system, an orientable optical sighting instrument was employed; the movements of said sighting instrument (in azimuth and in elevation) are associated with the movements of an electronic camera (for example of the type described in U.S. patents, No. 2,967,247 granted on Jan. 3, 1961, and No. 2,965,762 granted on Dec. 20, 1960) in such a manner as to ensure that the optical axis of the sighting instrument is always parallel to (and practically coincident with) the optical axis of the camera. Said camera is adapted to control an electronic circuit which delivers correcting signals; said signals are in turn transmitted to the missile and produce action on the flight controls of said missile so as to maintain this latter on the above-mentioned optical axes or to bring back said missile onto said axes in the event of deviation. Consequently, the tracking operator need only point the sighting instrument at the target to be reached by the missile in order to ensure that the missile is on the correct flight path.

In practice, this remote guidance system is employed in the case of self-propelled missiles which carry luminous "tracers" or flares. By virtue of their relative brightness, these flares serve to indicate the missile positions against the topographical background of the target area.

This mode of operation of the remote guidance system is evidently conceivable only for daytime operation when the target is optically visible either from the launching or the tracking station, and when the tracking operator is not dazzled by the luminous missile tracers.

In the case of night operation, it is necessary to illuminate the general target area for the purpose of seeking and locating the target. To this end, infra-red projectors are employed which, by virtue of special sighting devices such as image transformers, permit of optical sighting of the target from the launching or tracking station.

However, under night conditions, the missile-borne flares which move within the useful field of view of the sighting means become particularly troublesome sources of radiation on account of their brightness (which also results in a loss of discrimination), inasmuch as the radiation emitted by said sources saturates the optical sighting means (image transformer) and the observer is consequently dazzled, which is highly detrimental to accurate tracking and flight path control.

During flight, the propulsion engines of the missile emit thermal radiation. However, the quantity of radiation is usually too small to constitute a hindrance to night sighting.

The object of this invention is to ensure that the means for viewing the target area are protected from saturation caused by the missile so that the target which is illuminated by infra-red light may be viewed by the launching station operator more distinctly and with maximum convenience while at the same time increasing the degree of precision achieved both in sighting and consequently in flight path control.

The general means which forms the basic concept of the invention and which makes it possible to obtain the result stated above is especially characterized in that the sighting means (image transformer, for example) and the electronic camera of the remote guidance station are designed to have zones of spectral sensitivity of maximum value in the infra-red region, said zones being as distant from each other as possible, and that on the one hand the target area and the missile to be directed onto said target by remote guidance are exposed to infra-red radiation by means of an infra-red source designed to emit radiations which embrace both spectral sensitivity zones aforesaid and, on the other hand, there are disposed on that part of the missile which is visible from the remote guidance station, instead of the usual flares, reflecting-filtering means adapted to absorb to a maximum extent the infra-red range corresponding to the zone of maximum spectral sensitivity of the visual observation means and to reflect to a maximum extent the infra-red range corresponding to the zone of maximum spectral sensitivity of the electronic camera.

In order to obtain a clear idea, it will be assumed that the sighting means comprise an image transformer which is adapted to afford in the infra-red region a zone of maximum spectral sensitivity within the range of 0.8 to $1.2\mu$, that the electronic camera is adapted to have a zone of maximum spectral sensitivity within the range of 1.8 to $2.6\mu$, that the infra-red source emits a spectrum within the range of 0.6 to $2.6\mu$ and, finally, that the reflecting-filtering means which are mounted on board the missile absorb mainly the band which lies within the range of 0.6 to $1.5\mu$ and reflect mainly the band which is located between 1.5 and $2.6\mu$.

It is readily apparent that, by virtue of the selection performed at the missile, the image transformer will not "see" that missile but only the target area (especially as a result of infra-red radiation reflected from the target within the band which lies between 0.8 and $1.2\mu$), whereas the infra-red radiation which is reflected from the missile will impinge upon the camera. In other words, the observer or tracking operator will not be dazzled by radiation emitted by the missile.

The general means which constitute the basic principle of the invention can be carried into execution in a number of different ways.

Thus, the reflecting-filtering means can consist of means employed solely for the purpose of reflecting infra-red radiation and beyond which (relatively to the missile) are disposed means which have only a filtering function.

The reflecting means can consist of either one or a plurality of metallic plates fabricated of aluminum, for example.

The reflecting means can consist of one or a plurality of prisms of glass, of fluorine or of germanium.

The reflecting means can consist of one or a plurality of elements having a catadioptric structure, or a faceted structure of the so-called "cat's-eye" reflector type, the trim of the missile which carries the reflecting-filtering means being capable of varying between wide limits.

The reflecting means can also be adapted by virtue of their composition and shape to perform the function of filtering means.

In order that the electronic camera may be protected at least to a partial extent from infra-red radiations reflected from the target and/or the target area, there can be placed in front of the camera a filter which is adapted to absorb infra-red rays having wave-lengths of less than $1.5\mu$, for example.

Similarly, in order that the sighting means may be even more effectively protected from radiations reflected from the missile, said sighting means can be fitted with a filter which absorbs infra-red rays having wave-lengths greater than $1.2\mu$.

In order to increase the differentiation between the topographical background and the missile, the radiation emanating from the infra-red source can be modulated. In an alternative form, the radiation emitted by the source is not modulated, but the reflecting means which are mounted on board the missile are adapted to modulate the reflected radiation.

In a variant of the invention, the infra-red source is adapted to irradiate practically only the immediate target area (and to emit for this purpose a narrow beam) whereas that portion of the missile which is visible from the remote guidance station is equipped with radiation-emitting means for producng only infra-red radiation in the range corresponding to the zone of maximum spectral sensitivity of the electronic camera.

In the variant under consideration, the radiation-emitting means on board the missile comprise an infra-red source combined wtih filtering means which permit the passage only of wavelengths within the range of 1.5 to $2.6\mu$.

Further properties and advantages of the invention will become apparent from the following description which relates to a few examples of execution of the invention, said examples being shown diagrammatically in the accompanying drawings, in which.

Figure 1:
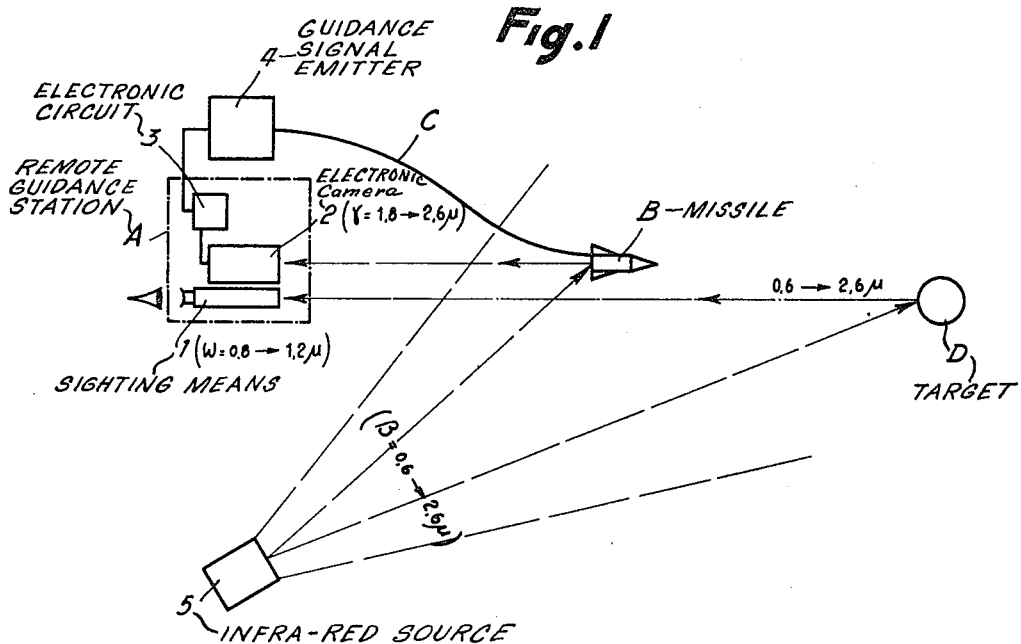
FIG. 1 is a general view in which are grouped together the remote guidance system of a self-propelled guided missile, the missile itself, the target or target area onto which it is intended to direct the missile and, finally, the infra-red radiation source which illuminates simultaneously both the general target area and the missile.

In FIG. 1, the reference symbol A designates a remote guidance station (for example of the type described in U.S. Patent No. 2,989,640 of June 20, 1961) comprising visual observation or so-called sighting means 1, an electronic camera 2 having an optical axis which is parallel to (and practically coincident with) the optical axis of said sighting means which are orientable as a single unit with the camera, said camera being coupled to an electronic circuit 3 which is connected to a remote guidance signal emitter 4.

Figure 11:
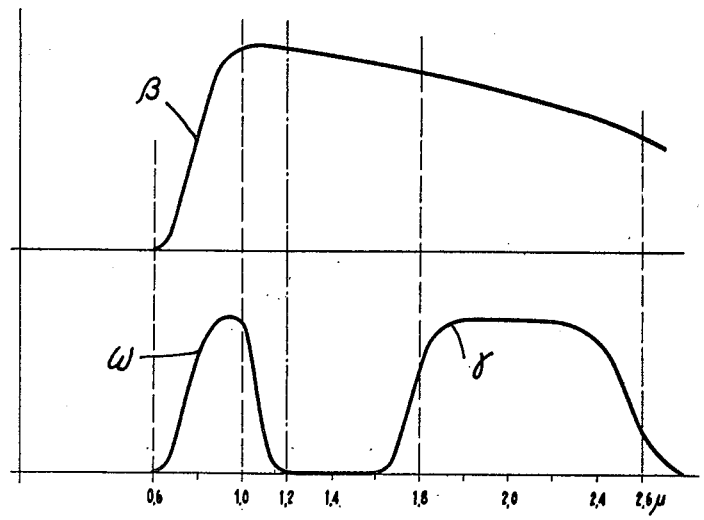
FIG. 11 is a diagram in which is shown on the one hand the curve of distribution of infra-red energy which is produced by the source (primary emission) and the curves of sensitivity of an image transformer and of an electronic camera.

The electronic camera 2 is regulated so as to have a maximum spectral sensitivity within the infra-red band which lies within the range of 1.8 to $2.6\mu$ (curve $\gamma$ in FIG. 11) whilst the sighting means comprise an image transformer (for converting an infra-red image to an image which is located within the visible spectrum) having a maximum spectral sensitivity between 0.8 and $1.2\mu$ (curve $\omega$ in FIG. 11).

In this same figure, the reference symbol B is employed to designate a self-propelled missile which is coupled, for example by means of connecting command wires C, to the signal emitter 4 and which is to be directed onto a target D.

Figure 2:
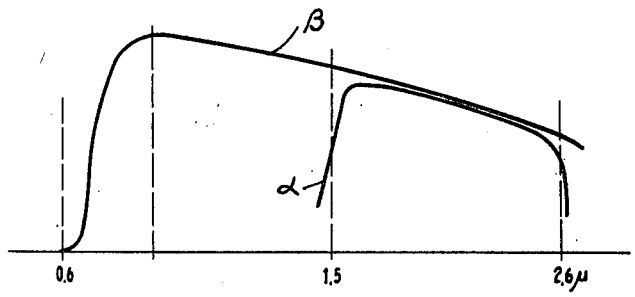
FIG. 2 is a diagram of the spectral distribution of energy in the infra-red region in the case of radiation produced by the infra-red source (primary emission) and of the energy in the infra-red region in the case of radiation reflected by the separating means (secondary emission) with which the guided missile is equipped.
Figure 3:
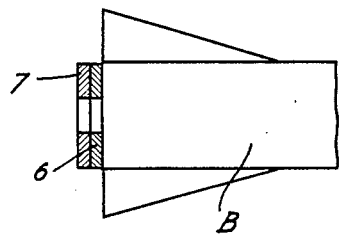
FIG. 3 is a profile view of the rear portion of the missile and showing in cross-section the selective reflecting means.
Figure 4:
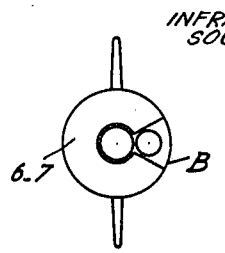
FIG. 4 is a view looking on the rear of the missile of FIG. 3 in which a location is reserved to accommodate a flare for daytime flight guidance.

Is accordance with the invention, the radiation beam of an infra-red source 5 is directed simultaneously onto the target D and onto the missile B (when this latter is located within the control zone of the camera 2), said infra-red radiation source being designed (in accordance with conventional practice) to emit infra-red radiations which extend over the band 0.6 to $2.6\mu$, for example along the spectral energy distribution curve $\beta$ of FIGS. 2 and 11.

In accordance with the invention, the missile B is fitted with reflecting means 6 and filtering means 7 which are so designed as to permit the passage only of the band in the range of wavelengths between 1.5 and $2.6\mu$ (curve $\alpha$ in FIG. 2), for example, and to absorb the band which extends from 0.6 to $1.5\mu$.

In view of the fact that the useful spectral sensitivity of the electronic camera is within the range 1.8 to $2.6\mu$, it is immediately apparent that the infra-red rays reflected by the missile-borne unit 6–7 will impinge upon said camera and that this latter will accordingly produce the necessary control action for the remote guidance of the missile along its optical axis (which, as has already been stated, can be considered as coincident with the optical axis of the sighting means 1). On the other hand, the infra-red radiation which is reflected from the unit 6–7 will not produce any action on the image transformer of the sighting means 1. The observer or tracking operator will therefore not see (or will not at least be dazzled by) the projectile and will therefore not be prevented from observing the target from which the reflected infra-red radiation is utilized by the image transformer within the range which extends from 0.8 to $1.2\mu$.

Figure 5:
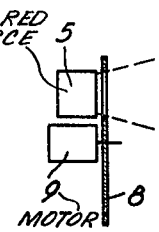
FIG. 5 is a diagram of a system of modulation of the radiation produced by the infra-red source.

As shown in FIG. 5, the radiations emitted by the infra-red source 5 can be modulated, for example by means of a rotating shutter 8 driven by a motor 9, thereby permitting the possibility of employing alternating-current amplifiers for the electronic goniometer of station A. Furthermore, discrimination with respect to topographical background will be further enhanced inasmuch as said background does not have the same reflecting power in the spectral region considered.

Instead of modulating the radiation at the source 5, the radiation can be modulated in the reflecting system which is located on board the missile; this alternative is even better, inasmuch as the contrast with the topographical background is considerably enhanced by an electronic separation in the circuits of the infra-red receiving goniometer (electronic camera) between the topographical background continuum and the modulated reflected signal.

The reflecting means 6 and filtering means 7 can be designed in very different ways.

Figure 6:
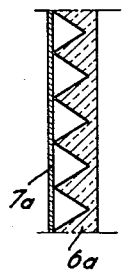
FIGS. 6, 7, 8, 9 and 10 are partial sectional views of a number of embodiments of the selective reflecting means carried by the missile; and finally.

Accordingly, as is shown in FIG. 6, the reflecting means can consist of a catadioptric reflector 6a having a striated prismatic surface 10, the filtering means being constituted by a strip or thin plate 7a of organic material, for example. The thin plate referred-to can also have a striated surface which is complementary to the prismatic surface 10 and which is directed towards said surface 10.

Figure 7:

In the form of execution which is shown in FIG. 7, the reflecting materials 6z are chosen so as to perform simultaneously (at least to a partial extent) the functions which are carried out by the filtering means.

Figure 8:
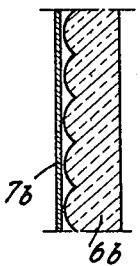

In the alternative form which is shown in FIG. 8, the elements 6b and 7b play the same part as in FIG. 6.

Figure 9:
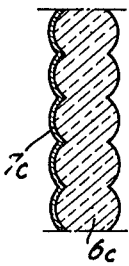

In the alternative form which is shown in FIG. 9, the filtering element is designed in the form of a layer or coating 7c which is applied on the reflecting element 6c.

Figure 10:
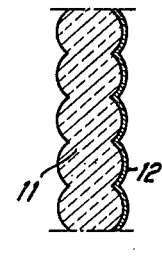

In the embodiment of FIG. 10, use is made of an optical support 11, on one face of which is applied a selective reflecting layer 12.

In another form of execution of the invention, it is possible for the purpose of irradiating the target D to employ an infra-red source having a narrow beam (whether modulated or not) which may be limited to the range extending from 0.6 to 1.5µ, for example, and to provide on board the missile B separate infra-red radiation-emitting means, the radiation of which is confined to a range located above 1.5µ, for example.

It is apparent that the example of execution of the invention and of its alternative forms as hereinabove described and illustrated in the accompanying drawings have been given solely by way of indication and that any detail modifications can be made therein without consequently departing either from the scope or the spirit of the invention.

What I claim is:

1. An aiming system for the remote guidance, from a command station, of a self-propelled missile towards a target, comprising in combination optical sighting means capable of being oriented so that the optical axis thereof can be pointed at said target, said optical sighting means having a maximum spectral sensitivity in a first infra-red band; an orientable electronic camera for emitting signals as a function of the derivation of said missile with respect to the line of sight of said camera, said orientable electronic camera having a maximum spectral sensitivity in a second infra-red band as distant as possible from the said first band and positively coupled to said sighting means in order that said optical axis and said line of sight remain parallel to each other; means for irradiating said target and said missile with infra-red radiations including said two infra-red bands; and reflecting-filtering means mounted on said missile for reflecting, towards said orientable electronic camera, infra-red radiations substantially within said second infra-red band.

2. The aiming system of claim 1, wherein the reflecting-filtering means of the missile comprises reflecting means covered by filtering means.

3. The aiming system of claim 1, wherein the reflecting-filtering means comprises reflecting means performing a filtering function by virtue of its shape.

4. The aiming system of claim 1 wherein the reflecting-filtering means comprises reflecting means performing a filtering function by virtue of its composition.

5. The aiming system of claim 1, wherein the irradiation means consists of a modulated infra-red source.

6. The aiming system of claim 1, wherein said system additionally comprises radiation-modulating means disposed on board said missile for the purpose of modulating the radiation which is reflected by the reflecting-filtering means.

7. The aiming system of claim 1, wherein said system additionally comprises radiation filters placed in front of the optical sighting means to produce better discrimination between the radiation derived from said target and the radiation derived from said missile.

8. The aiming system of claim 1, wherein said system additionally comprises radiation filters placed in front of the electronic camera to produce better discrimination between the radiation derived from said target and the radiation derived from said missile.

9. An aiming system for the remote guidance, from a command station, of a self-propelled missile towards a target, comprising in combination optical sighting means capable of being oriented so that the optical axis thereof can be pointed at said target, said optical sighting means having a maximum spectral sensitivity in a first infra-red band; an orientable electronic camera for emitting signals as a function of the deviation of said missile with respect to the line of said camera, said orientable electronic camera having a maximum spectral sensitivity in a second infra-red band as distant as possible from said first band and positively coupled to said sighting means in order that said optical axis and said line of sight remain parallel to each other; means for irradiating said target with infra-red radiation including at least the first infra-red band; and the infra-red radiation emitting means mounted on board said missile for emitting, towards said orientable electronic camera, infra-red radiations substantially free of radiations included in said first band.

References Cited

UNITED STATES PATENTS

| 2,989,640 | 6/1961 | Turck | 250—203 |
| 3,010,019 | 11/1961 | Sohst. | |
| 3,098,933 | 7/1963 | Barasch. | |
| 3,165,749 | 1/1965 | Cushner. | |

RALPH G. NILSON, Primary Examiner

M. J. FROME, Assistant Examiner

U.S. Cl. X.R.

250—203